(12) United States Patent
Ishikawa

(10) Patent No.: US 6,975,681 B2
(45) Date of Patent: Dec. 13, 2005

(54) METHOD AND APPARATUS FOR CODING MOVING PICTURES

(75) Inventor: Hiroyuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 582 days.

(21) Appl. No.: 10/138,699

(22) Filed: May 6, 2002

(65) Prior Publication Data

US 2002/0168008 A1 Nov. 14, 2002

(30) Foreign Application Priority Data

May 8, 2001 (JP) .............................. 2001-137840

(51) Int. Cl.[7] .............................................. H04N 7/18
(52) U.S. Cl. .............................. 375/240.15; 375/240.16
(58) Field of Search .......................... 375/240.1–240.18

(56) References Cited

U.S. PATENT DOCUMENTS

| | | | | | |
|---|---|---|---|---|---|
| 5,689,305 | A | * | 11/1997 | Ng et al. ................ | 375/240.15 |
| 5,801,778 | A | * | 9/1998 | Ju .......................... | 375/240.15 |
| 5,825,421 | A | * | 10/1998 | Tan ........................ | 375/240.15 |
| 6,351,545 | B1 | * | 2/2002 | Edelson et al. ............. | 382/107 |

FOREIGN PATENT DOCUMENTS

| | | |
|---|---|---|
| JP | 8-289301 | 11/1996 |
| JP | 11-239350 | 8/1999 |
| JP | 2000-134629 | 5/2000 |
| JP | 2000-224593 | 8/2000 |

\* cited by examiner

*Primary Examiner*—Andy Rao
(74) *Attorney, Agent, or Firm*—McGinn IP Law Group, PLLC

(57) ABSTRACT

A moving picture coding method and apparatus is provided that performs motion compensation interframe predictive coding, thus improving the compression efficiency. The magnitude of a forward motion vector, acquired through a forward motion vector search to a P-frame, is reduced in accordance with a frame distance between each B-frame and a reference frame (an I- or P-frame). The reduced forward motion vector is distributed as a forward motion vector to each of B-frames which undergoes bidirectionally motion compensation interframe predictive coding. Of B-frames, a B-frame following an I- or P-frame is subjected to a backward motion vector search while the I- or P-frame is used as a reference frame. The magnitude of the resultant backward motion vector is reduced in accordance with a frame distance between each B-frame and the reference frame (I- or P-frame). The reduced vector is distributed as a backward motion vector. Bidirectionally motion compensation interframe predictive coding is performed using the forward motion vector and the backward motion vector.

15 Claims, 4 Drawing Sheets

PREDICTIVE PROCESS UNIT IN ONE STEP

MOTION VECTOR DISTRIBUTION

METHOD AND APPARATUS FOR CODING MOVING PICTURES

BACKGROUND OF THE INVENTION

The present invention relates to a method and apparatus for coding moving pictures. Particularly, the present invention relates to a moving picture coding method and apparatus for coding motion-compensated interframe prediction.

In a prior art, the signal compressive coding technique is well known that compressive encodes moving picture signals through interframe predictive coding, employing motion compensation, before recording or transmitting them.

MPEG (Moving Picture Experts Group) is a standard for coding moving pictures. The frame configuration of MPEG (particularly, MPEG1) will be now explained by referring to FIG. 2. Frames of MPEG are classified into three types, namely, I pictures in which only intra-frame coding is performed, P pictures in which forward prediction (frontward prediction) is performed using a past frame, and B pictures in which forward prediction or inverse (backward) prediction or bidirectionally is performed using both a past frame and a future frame. In the case of the B picture, the forward mode, the backward mode, or bidirectionally mode can be selectively used every block (a mode with a smallest predictive error is selected). In the MPEG1, a picture group, formed of an I picture, plural P pictures arranged between I pictures at predetermined frame intervals, and plural B pictures arranged between an I picture and a P picture or between P pictures, is handled as a process unit. Since the B picture is used to predict a future frame, frames are rearranged in coding. For example, in the frame arrangement as shown in FIG. 2, the processing order becomes I0, P3, B1, B2, P6, B4, B5 . . . .

There is the so-called block matching method as a motion vector detection (search) method for performing motion-compensated interframe prediction. As to a reference block corresponding to a predictive object block, which is at the same location within a reference frame, a differential value (=the sum of absolute values of differentials between pixels) to the predictive object block is computed over a predetermined search range every macroblock being a unit for motion compensation prediction. Thus, time correlation is evaluated. A block having a highest correlation (=a minimum differential value) to the predictive object block is determined as an optimum predictive block. The positional difference between the optimum predictive block and the predictive object block can be detected as a motion vector.

In the motion-compensated interframe prediction, a broader search range of a motion vector allows an accurate motion vector to be acquired but results in a sharp increase of the computational volume. When a high-speed compressive processing is required, the method of suppressing a decrease of the processing rate by adaptively narrowing the search range is generally carried out. Such a method is disclosed in, for example, Japanese Utility Model Laid-open Application No. 1993-43681.

In the motion compensation prediction of the image coding apparatus, disclosed in the above prior art, the direction of a motion vector in a current motion compensation predictive process is estimated using a motion vector obtained by the previous motion compensation predictive process. An area, of which the probability that a motion vector moves toward the area is low, is not computed for evaluation. Thus, the number of search points is reduced so that the processing speed is improved.

However, this method has the disadvantage in that the processing volume is proportionally increased in accordance with a frame to be subjected to motion compensation prediction, particularly in accordance with the number of frames to be subjected to bidirectionally.

JP-A No. 1999-239350 discloses the method of realizing high-speed processing by changing the computational method in accordance with a search precision. However, this method has the disadvantage in that the processing volume increases.

JP-A No. 1996-289301 discloses the method of realizing a high-speed motion vector search by adaptively sampling a reference frame to reduce the computational volume of the block matching process. In this method, when an increasing number of frames to be subjected to motion compensation prediction leads to an increasing number of blocks to be subjected to a block matching process, the computation in the block matching process is excessively omitted. Consequently, this method has the disadvantage in that motion vectors cannot be accurately obtained.

JP-A No. 2000-134629 discloses a motion vector detection method in which that a next motion vector search range is determined using a motion vector already obtained in a reference block, whereby the computational volume can be reduced, compared with the case where a search range is fixed.

Moreover, JP-A No. 2000-224593 discloses the frame interpolation method of creating an interpolation frame during decoding in the motion compensation predictive coding and decoding, whereby the interpolation mode can be set more finely in comparison with block units.

SUMMARY OF THE INVENTION

The present invention is made to solve the above-mentioned problems. An object of the present invention is to provide a moving picture coding method capable of obtaining motion vectors at high speed to improve the compression efficiency. An object of the present invention is to provide a moving picture coding apparatus capable of obtaining motion vectors at high speed to improve the compression efficiency.

In order to accomplish the above-mentioned object, the present invention is characterized by a moving picture coding method, which uses intra-frame coding and forward motion compensation interframe predictive coding to a moving picture signal, in predetermined block units and at predetermined frame intervals and uses bidirectionally motion compensation interframe predictive coding to plural B-frames between an I-frame and a P-frame, the I-frame being subjected to the intra-frame coding, the P-frame being subjected to the forward motion compensation interframe predictive coding, the method comprising the steps of reducing the magnitude of a forward motion vector in accordance with a frame distance between each B-frame and a reference frame (an I- or P-frame) used for the forward motion-compensated interframe prediction, the forward motion vector being obtained in a forward motion vector search of the P-frame, and then distributing a reduced vector as a forward motion vector to each of the B-frames; performing a backward motion vector search to a B-frame following the I- or P-frame of the B-frames, with the I- or P-frame used as a reference frame; reducing the magnitude of a backward motion vector in accordance with a frame distance between each B-frame and a reference frame (an I- or P-frame) used for the backward motion vector search, the backward motion vector being obtained in the motion vector search, and then distributing a reduced vector as a backward motion vector; and using bidirectionally motion compensation interframe predictive coding to each of the B-frames, based on the forward motion vector distributed and the backward motion vector distributed.

In another aspect, the present invention is characterized by a moving picture coding method, which uses intra-frame coding and forward motion compensation interframe predictive coding to a moving picture signal, in predetermined block units and at predetermined frame intervals and uses bidirectionally motion compensation interframe predictive coding to plural B-frames between an I-frame and a P-frame, the I-frame being subjected to the intra-frame coding, the P-frame being subjected to the forward motion compensation interframe predictive coding, the method comprising the steps of obtaining a forward motion vector by performing a forward motion vector search of the P-frame, with the I- or P-frame used as a reference frame, and then using forward motion compensation interframe predictive coding to the forward motion vector; distributing a reduced vector as a forward motion vector to each of the B-frames, the reduced vector being obtained by reducing the magnitude of a motion vector, using the forward motion vector, and in accordance with a frame distance between a reference frame and each B-frame used for the forward motion vector search; performing a backward motion vector search of a B-frame following the I or P-frame of the B-frames, with the I- or P-frame used as a reference frame, and thus obtaining a backward motion vector; distributing a reduced vector as a backward motion vector to each of the B-frames, the reduced vector being obtained by reducing the magnitude of the motion vector, using the backward motion vector, and in accordance with a frame distance between a reference frame and each B-frame used for the backward motion vector search; and using a bidirectionally motion compensation interframe predictive coding to each of the B-frames, based on the forward motion vector and the backward motion vector.

The moving picture coding method further comprises a search range changing step for shifting a motion vector search range by a forward motion vector from a reference position to obtain a shifted search range, the forward motion vector being obtained in the forward motion vector search to the reference frame, and thus determining said shifted search range as a current search range.

In the moving picture coding method, the search range changing step comprises the step for adaptively changing a search range so as to include an original search reference position when the forward motion vector is larger than a predetermined value.

The moving picture coding method further comprises a re-searching step for obtaining a motion vector by performing a motion vector search over a predetermined range, using a bidirectionally motion vector distributed to each B-frame, with a position corresponding to the bidirectionally motion vector within a reference frame used as a reference position, and determining the motion vector as a motion vector to each B-frame.

In further another aspect, the present invention is characterized by a moving picture coding apparatus, which uses intra-frame coding and forward motion compensation interframe predictive coding to a moving picture signal, in predetermined block units and at predetermined frame intervals and uses bidirectionally motion compensation interframe predictive coding to plural B-frames between an I-frame and a P-frame, the I-frame being subjected to the intra-frame coding, the P-frame being subjected to the forward motion compensation interframe predictive coding, the apparatus comprising a frame rearranger for storing input frames and rearranging the input frames in the order of coding; a motion searcher for obtaining a forward motion vector by receiving the P-frame and a reference frame (the I- or P-frame) and by performing a forward motion vector search, and for obtaining a backward motion vector by receiving a B-frame following the I- or P-frame of the B-frames and a reference frame (the I- or P-frame) and by performing a backward motion vector search; a motion vector storage for holding each of motion vectors obtained by the motion searcher; a vector distributor for distributing a reduced vector as a bidirectionally motion vector to each B-frame, with the I- or P-frame used as a reference frame, the reduced vector being obtained by reducing the magnitude of each motion vector, using the forward motion vector and the backward motion vector and in accordance with a frame distance to the I- or P-frame; a predictive error creator for computing a differential to a predictive picture using the each motion vector and the reference frame, in the P or B-frame, and then outputting a predictive error signal; a frequency converter/quantizer for frequency converting and quantizing the I-frame or the predictive error signal and then outputting quantized data; a variable-length encoder for performing a variable-length coding of the quantized data and then outputting encoded data; an inverse quantizer/inverse frequency converter for inverse quantizing and inverse-frequency converting the quantized data and then outputting decoded data; a reference frame creator for creating a reference frame from the decoded data through motion-compensated interframe prediction; and a frame memory for storing the reference frame.

In the moving picture coding apparatus, the motion vector searcher shifts a motion vector search range by the forward motion vector from a reference position to obtain a shifted search range and then determines said shifted search range as a current search range, the forward motion vector being obtained through a forward motion vector search of a reference frame used for the forward motion vector search.

In the moving picture coding apparatus, the motion vector searcher adaptively changes a search range so as to include an original search reference position when the forward motion vector is larger than a predetermined value.

In the moving picture coding apparatus, the motion vector searcher obtains a motion vector by performing a motion vector search of each of the B-frames over a predetermined range, using the bidirectionally motion vector, with a position within a reference frame corresponding to the bidirectionally motion vector used as a reference position, and then determines the motion vector as a motion vector in each B-frame.

BRIEF DESCRIPTION OF THE DRAWINGS

This and other objects, features and advantages of the present invention will become more apparent from the following detailed description taken in conjunction with the attached drawings, in which.

DESCRIPTION OF THE EMBODIMENTS

Embodiments according to the present invention will be described in detail by referring to the attached drawings.

For the convenience of explanation, a frame to which intra-frame coding is performed is called "a frame I"; a frame to which forward motion compensation interframe predictive coding is performed is called "a frame P"; and other frames each which does not become a reference frame in interframe prediction, are called "an intermediate frame" or "a frame M". Moreover, a frame undergoing backward motion vector search, of intermediate frames, is called "a frame R". The processing unit in each motion-compensated interframe prediction corresponds to a block of a predetermined size (e.g. a macroblock of 16×16 pixels).

Figure 1:
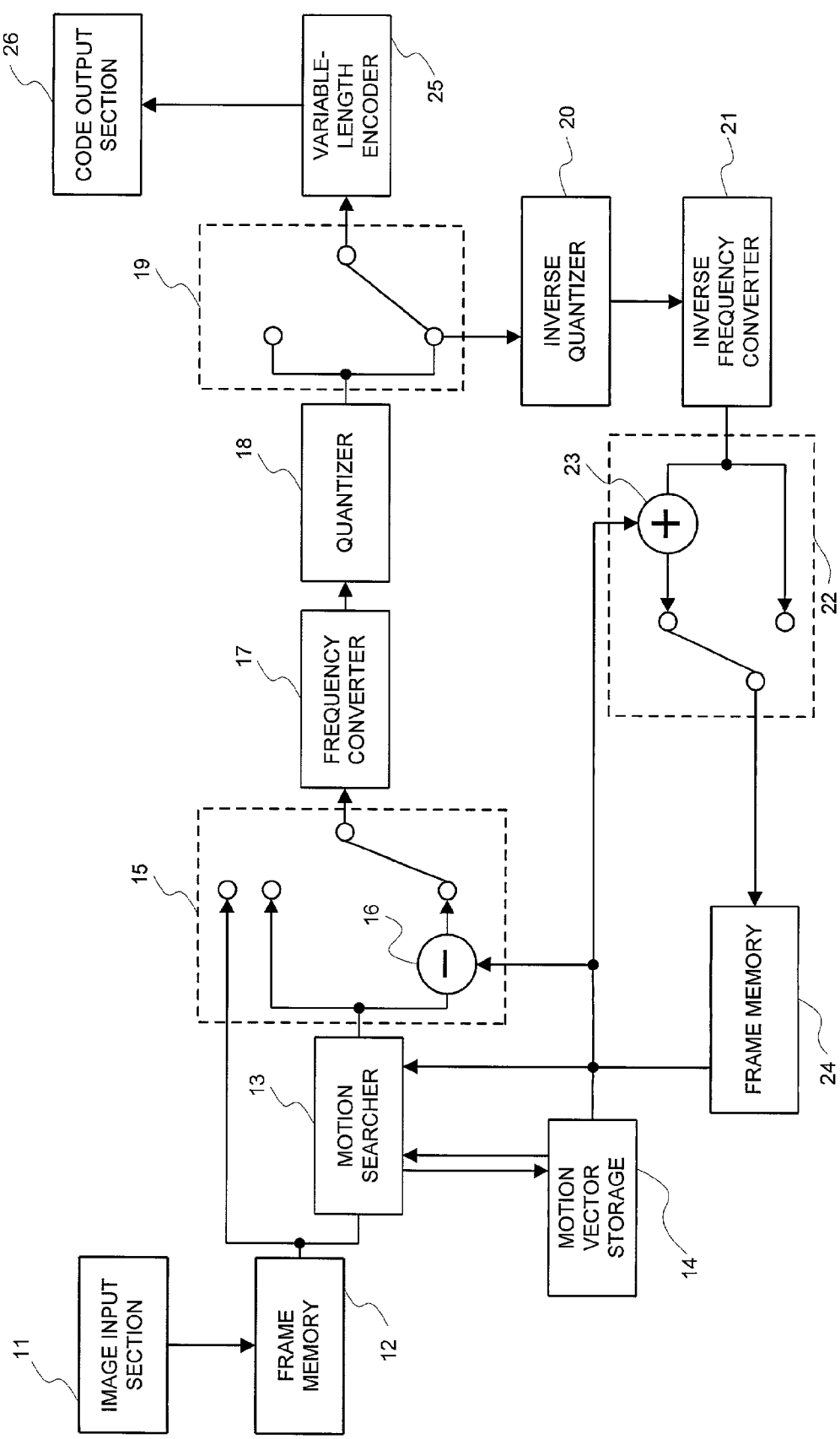
FIG. 1 is a block diagram illustrating the configuration of a moving picture coding apparatus according to an embodiment of the present invention.
Figure 2:
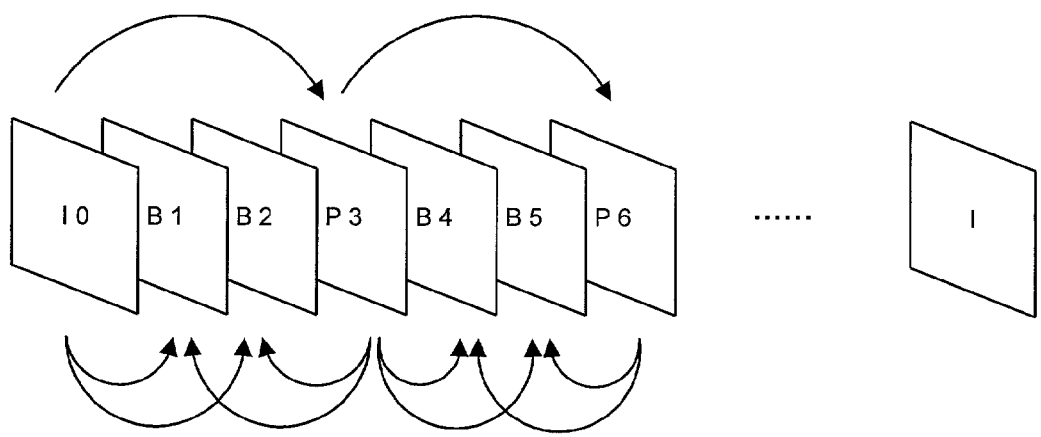
FIG. 2 is a diagram illustrating a frame configuration of MPEG.

FIG. 1 is a block diagram illustrating the configuration of a moving picture coding apparatus according to an embodiment of the present invention. Referring to FIG. 1, the moving picture coding apparatus coding device consists of an image input section 11, a frame memory 12, a motion searcher 13, a motion vector storage 14, a selector 15, a frequency converter 17, a quantizer 18, a selector 19, an inverse quantizer 20, an inverse frequency converter 21, a selector (decoder) 22, a frame memory 24, a variable-length encoder 25, and a code output section 26.

The image input section 11 receives moving picture signals in frame units. The frame memory 12 temporarily stores frames. When frames necessary in a coding process in one cycle are input, frames to be encoded are output.

The motion searcher 13 performs a motion vector search to frames other than the frame I to acquire motion vectors. The motion searcher 13 performs the motion vector search by inputting an object frame (a current frame) output from the frame memory 12 and a reference frame stored in the frame memory 24. The motion vector storage 14 holds motion vectors obtained in each search process. The motion searcher 13 distributes motion vectors obtained in forward motion-compensated interframe prediction and backward motion-compensated interframe prediction, to each intermediate frame (to be described later).

The motion vector storage 14 holds respective motion vectors acquired in the motion vector search by the motion seacher 13 and issues, if necessary, information on them.

The selector 15 changes its switch in accordance with frame types. As to the frame P, the frame R, and the intermediate frame, the subtracter 16 receives a predictive object block and a predictive image (=an optimum predictive block=a reference frame+motion vector information) and then outputs a predictive error signal. When the evaluation value of an optimum predictive block acquired in the motion vector search by the motion searcher 13 is larger than a predetermined threshold value (that is, when it is judged that the interpolation to a predictive object block is low), the selector is changed to perform intra-frame coding to the block.

By frequency converting the data in the frame I without any change and frequency converting predictive error data in the frame P, the frame R, and the intermediate frame, the frequency converter 17 outputs a conversion coefficient. The quantizer 18 quantizes the conversion coefficient and then outputs a quantized code.

The selector 19 changes its switch in accordance with frame types. When the frame type is I or P required to create a reference frame, the selector 19 controls to output the signal to the inverse quantizer 20.

The variable-length encoder 25 performs variable-length coding to a quantized code and then outputs the resultant encoded data. The code output section 26 externally outputs the encoded data.

The inverse quantizer 20 inverse-quantizes a quantized code to create a reference frame in interframe prediction. The inverse frequency converter 21 inverse-frequency converts the conversion coefficient output from the inverse quantizer 20 and then outputs decoded data.

With the frame type P, the adder 23 in the selector 22 adds the decoded data (a predictive error) output from the inverse frequency converter 21 and a predictive image (=, an) optimum predictive block=a reference frame+a motion vector) and then creates a new reference frame. The reference frame is stored in the frame memory 24. With the frame type I, the decoded data is stored, without any change, as a reference frame in the frame memory 24.

Figure 3:
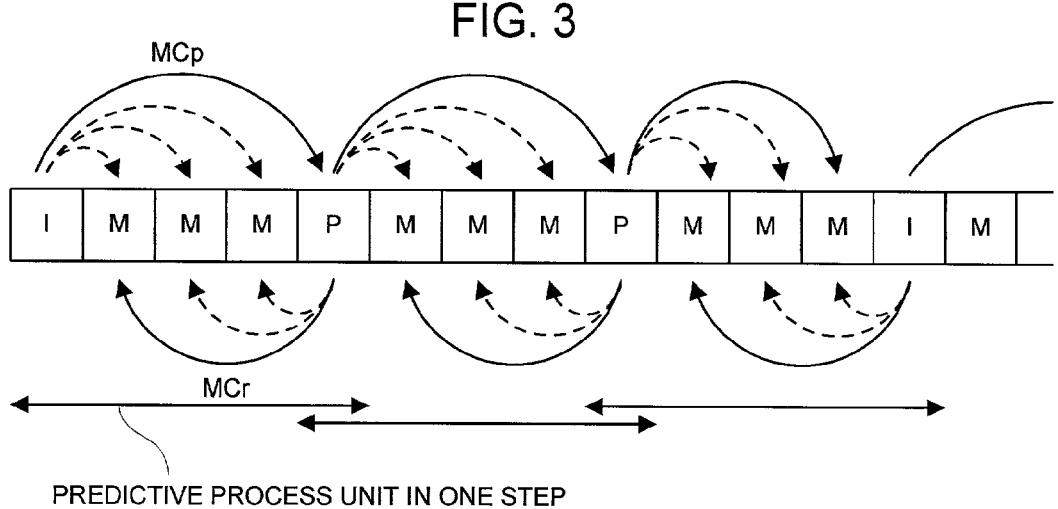
FIG. 3 is an explanatory of a moving picture coding method according to the present invention.
Figure 4:
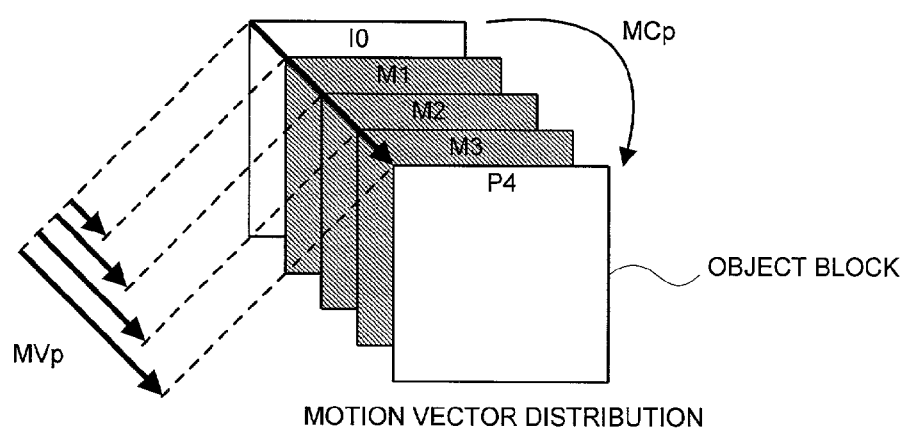
FIG. 4 is an explanatory diagram illustrating a procedure of distributing a motion vector to an intermediate frame.

The moving picture coding method according to the present invention will be explained below by referring to FIGS. 3 and 4. In the frame group IMMMP as shown in FIG. 3, the frame P is first subjected to a forward motion vector search and to a motion compensation interframe predictive coding while the frame I is used as a reference frame. Thus, a forward motion vector is acquired. Next, the frame M following the frame I is subjected to a backward motion vector search while the frame P is used as a reference frame. Thus, a backward motion vector is acquired. The forward motion vector and the backward motion vector are distributed to each intermediate frame M, in accordance with the amplitude corresponding to a frame-to-frame interval ratio.

The distribution of a motion vector to an intermediate frame will be described below by referring to FIGS. 3 and 4. First, the frame P is subjected to the forward motion compensation interframe predictive coding (=MCp) while the frame I (or P) is used as a reference frame. Thus, the motion vector (=MVp) is obtained. In this case, the frame I is not subjected to the forward motion-compensated interframe prediction. Instead, the frame M most spaced from the reference frame P is subjected to the forward motion compensation interframe predictive coding (that is, the frame M becomes a frame P).

Next, the frame M following the frame (I or P), (=the intermediate frame most spaced from the frame P subjected to the forward motion-compensated interframe prediction MCp=frame R), is subjected to a backward motion vector search (=MCr), with the frame P (or I) used as a reference frame. Thus, the motion vector (=MVr) is obtained.

The motion vector distribution processor in the motion searcher 13 distributes to each intermediate frame the motion vector MVp obtained through the forward motion-compensated interframe prediction MCp and the motion vector MVr obtained through the backward motion vector search MCr. The motion vector distributes each block corresponding to the same location in each frame. The motion vectors MVp and MVr, reduced in accordance with the frame distance between each intermediate frame and the reference frame (I or P), are distributed as a bidirectionally motion vector to the corresponding intermediate frame.

An example of motion vector distribution in forward prediction will be explained here. It is now assumed that the motion vector MVp04 obtained in the forward motion-compensated interframe prediction MCp04 in the frame P4, with the frame I0 acting as a reference frame, is, for example, (4, 12). The frame-to-frame distance (=the number of frames) between the frames I0 and P3 is 4. The frame-to-frame distance (=the number of frames) between the frames I0 and M1 is 1. Hence, the motion vector MVp01 in forward prediction in the frame M1, with the frame I0 acting as a reference frame, is (1, 3) being the component of the MVp04 of ¼ (that is, a frame-to-frame interval ratio). Similarly, the motion vector MVp02 in forward prediction in the frame M2, with the frame I0 acting as a reference frame, is (2, 6) being the component of the MVp04 of 2/4 (that is, a frame-to-frame interval ratio). The motion vector MVp03 in forward prediction in the frame M3, with the frame I0 acting as a reference frame, is (3, 9) being the component of the MVp04 of ¾ (that is, a frame-to-frame interval ratio).

Next, an example of motion vector distribution in backward prediction will be explained here. As a result of performing a backward motion vector search MCr41 in the frame M1, with the frame P4 acting as a reference frame, it is assumed that the resultant motion vector MVr41 is (−3, −6). The frame distance between the frame M1 and the frame P4 is 3. The frame distance between the frame M2 and the frame P4 is 2. Hence, the motion vector MVr42 in the backward prediction in the frame M2, with the frame P4 acting as a reference frame, becomes (−2, −4) being the component MVr41 of ⅔ (namely, a frame-to-frame interval ratio). Similarly, the motion vector MVr43 in the backward prediction in the frame M3, with the frame P4 as a reference frame, becomes (−1, −2) being the component MVr41 of ⅓ (namely, a frame-to-frame interval ratio).

The motion vector at each macroblock location in each intermediate frame is determined base on the above-mentioned results. That is, M1 is determined to be (1, 3) in the forward direction and to be (−3, −6) in the backward direction. M2 is determined to be (2, 6) in the forward direction and to be (−2, −4) in the backward direction. M3 is determined to be (3, 9) in the forward direction and to be (−1, −2) in the backward direction. Using these motion vectors, each intermediate frame undergoes the bidirectionally motion compensation interframe predictive coding.

The process for each frame type will be sequentially described here by referring to FIG. 1. First, the case where the type of frame is I will be explained. The frame I undergoes only the intra-frame coding. The frame I is sequentially processed in the order of the frequency converter 17, the quantizer 18, the variable-length encoder 25, and the code output section 26. Moreover, the frame I is sequentially processed in the order of the inverse quantizer 20 and the inverse frequency converter 21, so that a reference frame is created. Then, the created reference frame is stored in the frame memory 24 via the selector 22.

Next, the case where the type of frame is P will be explained here. The frame P undergoes the forward motion compensation prediction. First, the motion searcher 13 performs a motion search process of a past frame (I or P) as a reference frame. The motion vector storage 14 holds information on the obtained motion vector to use it in the following predictive process. The subtracter 16 computes a predictive error between a predictive object frame and a reference frame (a predictive image), using the motion vector obtained by the motion searcher 13.

When a block evaluation value in the block matching process is larger than a predetermined threshold value, intra-frame compression is controllably performed. For that reason, a predictive error is not computed. When a block evaluation value is smaller than a predetermined threshold value, the interframe predictive coding is performed.

In the frame P, the block to which the interframe predictive coding is performed is sequentially processed in the order of the frequency converter 17, the quantizer 18, the variable-length encoder 25, and the code output section 26. In order to create a reference frame, the inverse quantizer 20 and the inverse frequency converter 21 decode a predictive error. The adder 23 adds the decoded signal to a reference frame output from the frame memory 24 (=a predictive image) and then creates a reference frame. The reference frame is written into the frame memory 24.

In the frame P, the block to which the inter-frame prediction is not performed undergoes an intra-frame coding process in the order of the frequency converter 17, the quantizer 18, the variable-length encoder 25, and the code output section 26. Moreover, the inverse quantizer 20 and the inverse frequency converter 21 process the block to create a reference frame. Then the reference frame is written into the frame memory 24.

Next, an intermediate frame (M or R) will be explained here. The first intermediate frame is first subjected to a backward motion vector search MCr, as described above. Thus, the motion vector MVr is acquired and then is held in the motion vector storage 14. When the motion vector storage 14 has already held usable motion vector information, other intermediate frames undergo a motion vector distribution using the motion vector information, without any motion search by the motion searcher 13. In the selector 15, the subtracter 16 obtains a predictive error to a past or future frame using motion vectors distributed. It is assumed that when a predictive error is larger than a predetermined threshold value, intra-frame compression is controllably performed without the interframe prediction. In this case, the predictive error is not required. The resultant block data is encoded through the frequency converter 17, the quantizer 18, the variable-length encoder 25, and code output section 26. Because an intermediate frame does not require creating a reference frame, the frame memory 24 is not updated.

Figure 5:
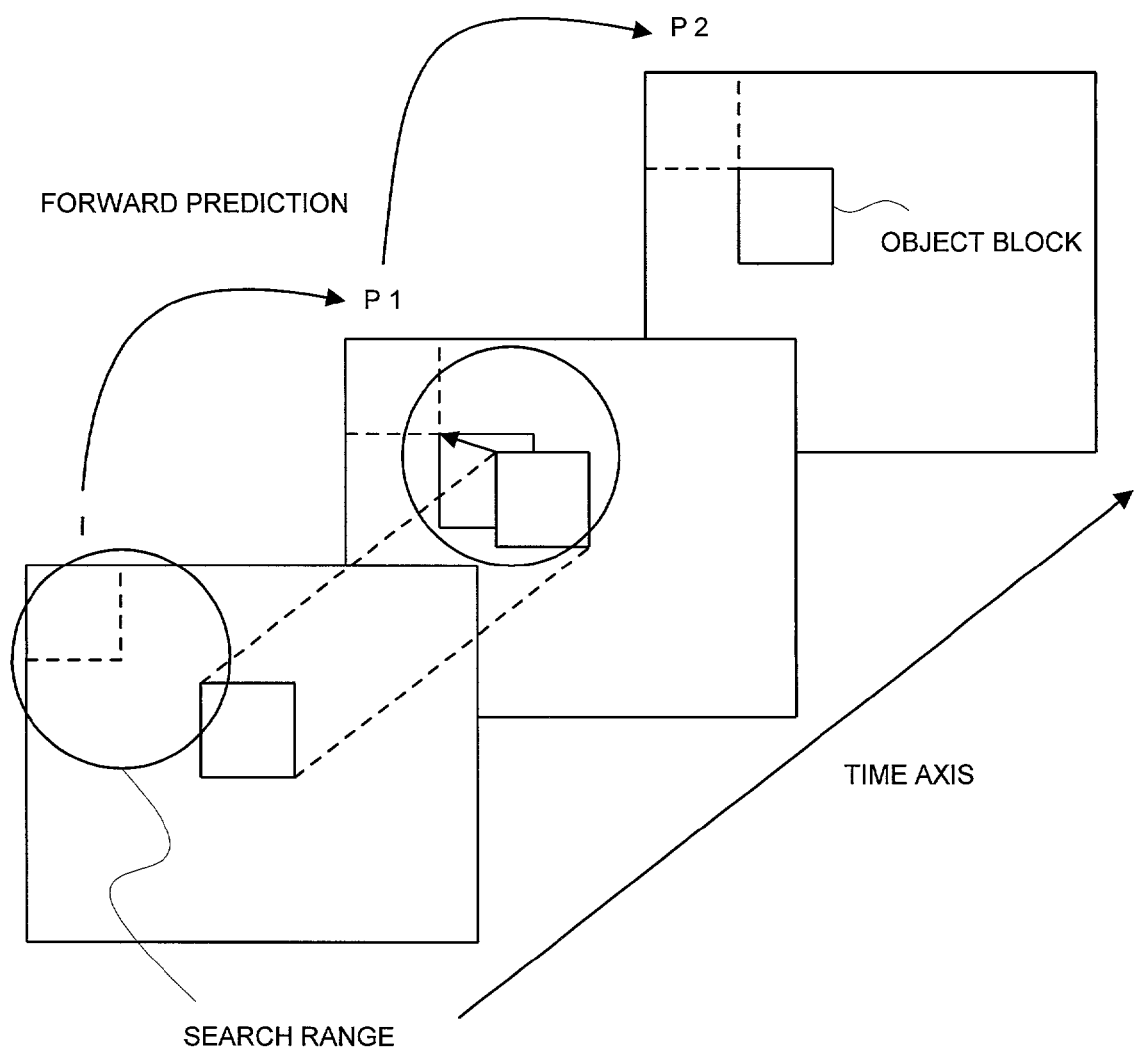
FIG. 5 is an explanatory diagram illustrating a motion vector search and a search range change in forward interframe prediction.

Next, a method of determining a motion vector search range will be described by referring to FIG. 5. The motion compensation prediction between the frame I and the frame P1 is first explained. For example, it is now assumed that at the block location (16, 16) in the frame P1, a motion vector is searched while the frame I is used as a reference frame. The inside of a circle of a predetermined pixel radius is searched. In a block matching process, when the block with a minimum evaluation value to the block at the location (16, 16) in the frame P1 corresponds to the block at the location (25, 19), the block movement is −9 in the horizontal direction and −3 in the vertical direction. As a result, the motion vector is (−9, −3).

Next, motion compensation prediction between the frame P1 and the frame P2 will be explained here. In the precious forward prediction process (I→P1), the block at the location (16, 16) in the frame P1 has moved from the frame I to the frame P1, that is, to (−9, −3). It is now assumed that a current movement from the frame P1 to the frame P2 in the forward prediction process is equal to that in the previous forward prediction process. Hence, it can be considered that the probability that the block at the location (25, 19) in the frame P1 will move to the block at the location (16, 16) in the frame P2 is strong. By searching a predetermined range around the location (25, 19), that is, the center, in the frame P1, the motion vector search can be effectively performed, compared with the case where the search range is fixed.

The original search reference position may become outside a search range because of a large movement due to a change in the search range. In such a case, when the movement of an object in a current predictive frame is zero or small, the position with a movement of zero cannot be set as a reference position. This leads to a large predictive error, that is, degradation of an image quality. For the countermeasures, the original search reference position may be differently searched as a search object or the search range may be adaptively widened to bring the original search reference position within a search range. In the forward prediction MCp in the first frame P following the frame I, the search starting position changing information cannot be acquired because no motion vector information exists in the previous forward prediction process. In this case, a standard search range, which has as a standard position the position of a reference block, is searched.

Figure 6:
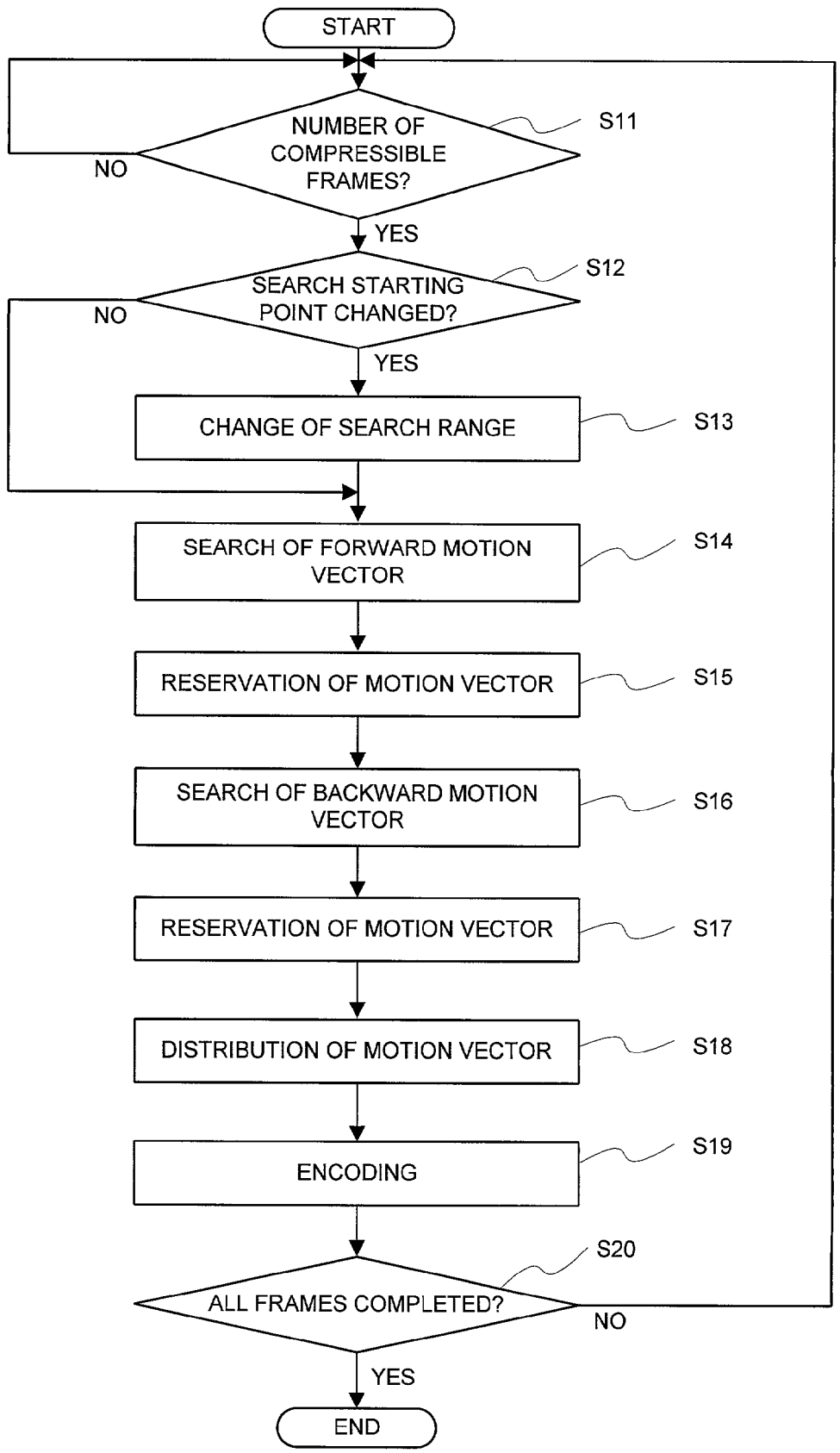
FIG. 6 is a flowchart showing the operation of a moving picture coding apparatus according to an embodiment of the present invention.

FIG. 6 is a flowchart showing the operation of a moving picture compressive coding apparatus according to the embodiment of the present invention. The image input section 11 receives moving picture data and stores frame data in the frame memory 12 while ascertaining whether or not it can be compressible (step S11).

It is assumed that frames necessary for a predictive coding process in one cycle are prepared and there is information on changes of a search starting position and a search range in a motion vector search (step S12/YES). In such a case, the search starting position and the search range are changed in accordance with the information (step S13). In this step, the motion vector information, which has already obtained in a past motion-compensated interframe prediction process of a reference block in a reference frame, is used as search starting position changing information, as described above.

Next, a frame group is subjected to a forward motion vector search and to motion-compensated interframe prediction coding (step S14). The motion vector storage 14 stores the forward motion vector information obtained in the search process to use it as starting position change information in the vector distribution at the rear stage and in the next forward motion-compensated interframe prediction (step S15).

Of intermediate frames, the frame most spaced in time from the frame P (or I) acting as a reference frame undergoes a backward motion vector search (step S16). The motion vector storage 14 holds the backward motion vector obtained in the search to use it in the vector distribution at the rear stage (step S17).

Each forward motion vector and each backward motion vector, obtained in the above step, are distributed to each intermediate frame with the magnitude proportional to the frame distance from the reference frame (step S18).

Each input frame is encoded by using the motion vectors obtained in the forward motion-compensated interframe prediction and in the backward motion vector search (step S19). This operation is repeated until all frames are compressed (step S10).

As described above, the method and device of coding moving pictures according to the present invention has been described. In each intermediate frame, a predetermined search range in each intermediate frame may be re-searched, with a position (acting as a center) in a reference frame corresponding to each distributed motion vector. Thus, the coding efficiency can be more improved.

A preferred embodiment according to the present invention has been shown as described above. However, it should be noted that the present invention is not limited to only the embodiment. Various modifications may be made within the range not departing from the scope of the present invention.

As apparent from the above description, the present invention can reduce the number of frames subjected to the motion vector search process, namely, the entire computational amount.

Moreover, a search range in the next motion vector search process is determined using motion vector information obtained in a past motion-compensated interframe prediction process. Thus, an accurate motion vector search can be performed to an object with a large movement.

Moreover, an object, which does not move at an equal rate, can be set within a search range by adaptively changing the search range to bring it to the original search reference position.

Moreover, the motion vector search process is omitted in only the intermediate frame and errors caused in the interframe prediction process are not accumulated. Hence, the compression process where degradation of an image quality is small may be performed.

The entire disclosure of Japanese Application Patent No. 2001-137840 filed on May 8, 2001 including specification, claims, drawings and summary are incorporated herein by reference in its entirely.

What is claimed is:

1. A moving picture coding method which uses intra-frame coding and forward motion compensation interframe predictive coding to a moving picture signal, in predetermined block units and at predetermined frame intervals and uses bidirectional motion compensation interframe predictive coding to plural B-frames between an I-frame and a P-frame, said I-frame being subjected to said intra-frame coding, said P-frame being subjected to said forward motion compensation interframe predictive coding, said method comprising:

reducing a magnitude of a forward motion vector in accordance with a frame distance between each B-frame and a reference frame (an I- or P-frame) used for said forward motion-compensated interframe prediction, said forward motion vector being obtained in a forward motion vector search of said P-frame, and then distributing a reduced vector as a forward motion vector to each of said B-frames;

performing a backward motion vector search to a B-frame following said I- or P-frame of said B-frames, with said I- or P-frame used as a reference frame;

reducing a magnitude of a backward motion vector in accordance with a frame distance between each B-frame and a reference frame (an I- or P-frame) used for said backward motion vector search, said backward motion vector being obtained in said motion vector search, and then distributing a reduced vector as a backward motion vector; and using bidirectional motion compensation interframe predictive coding to each of said B-frames, based on said forward motion vector distributed and said backward motion vector distributed.

2. A moving picture coding method method which uses intra-frame coding and forward motion compensation interframe predictive coding to a moving picture signal, in predetermined block units and at predetermined frame intervals and uses bidirectional motion compensation interframe predictive coding to plural B-frames between an I-frame and a P-frame, said I-frame being subjected to said intra-frame coding, said P-frame being subjected to said forward motion compensation interframe predictive coding, said method comprising:

obtaining a forward motion vector by performing a forward motion vector search of said P-frame, with said I- or P-frame used as a reference frame, and then using forward motion compensation interframe predictive coding to said forward motion vector;

distributing a reduced vector as a forward motion vector to each of said B-frames, said reduced vector being obtained by reducing a magnitude of a motion vector, using said forward motion vector, and in accordance with a frame distance between a reference frame and each B-frame used for said forward motion vector search;

performing a backward motion vector search of a B-frame following said I- or P-frame of said B-frames, with said I- or P-frame used as a reference frame, and thus obtaining a backward motion vector;

distributing a reduced vector as a backward motion vector to each of said B-frames, said reduced vector being obtained by reducing a magnitude of said motion vector, using said backward motion vector, and in accordance with a frame distance between a reference frame and each B-frame used for said backward motion vector search; and using a bidirectional motion compensation interframe predictive coding to each of said B-frames, based on said forward motion vector and said backward motion vector.

3. The method defined in claim 2, further comprising:

changing a search range for shifting a motion vector search range by a forward motion vector from a reference position to obtain a shifted search range, said forward motion vector being obtained in said forward motion vector search to said reference frame, and thus determining said shifted search range as a current search range.

4. The method defined in claim 3, wherein said search range changing comprises adaptively changing a search range so as to include an original search reference position when said forward motion vector is larger than a predetermined value.

5. The method defined in claim 2, further comprising:

re-searching for obtaining a motion vector by performing a motion vector search over a predetermined range, using a bidirectional motion vector distributed to each B-frame, with a position corresponding to bidirectional motion vector within a reference frame used as a reference position, and determining said motion vector as a motion vector to each B-frame.

6. A moving picture coding apparatus, which uses intra-frame coding and forward motion compensation interframe predictive coding to a moving picture signal, in predetermined block units and at predetermined frame intervals and uses bidirectional motion compensation interframe predictive coding to plural B-frames between an I-frame and a P-frame, said I-frame being subjected to said intra-frame coding, said P-frame being subjected to said forward motion compensation interframe predictive coding, said apparatus comprising:

a frame rearranger for storing input frames and rearranging said input frames in the order of coding;

a motion searcher for obtaining a forward motion vector by receiving said P-frame and a reference frame (said I- or P-frame) and by performing a forward motion vector search, and for obtaining a backward motion vector by receiving a B-frame following said I- or P-frame of said B-frames and a reference frame (said I- or P-frame) and by performing a backward motion vector search;

a motion vector storage for holding each of motion vectors obtained by said motion searcher;

a vector distributor for distributing a reduced vector as a bidirectional motion vector to each B-frame, with said I- or P-frame used as a reference frame, said reduced vector being obtained by reducing the magnitude of each motion vector, using said forward motion vector and said backward motion vector and in accordance with a frame distance to said I- or P-frame;

a predictive error creator for computing a differential to a predictive picture using said each motion vector and said reference frame, in said P- or B-frame, and then outputting a predictive error signal;

a frequency converter/quantizer for frequency converting and quantizing said I-frame or said predictive error signal and then outputting quantized data;

a variable-length encoder for performing a variable-length coding of said quantized data and then outputting encoded data;

an inverse quantizer/inverse frequency converter for inverse quantizing and inverse-frequency converting said quantized data and then outputting decoded data;

a reference frame creator for creating a reference frame from said decoded data through motion-compensated interframe prediction; and a frame memory for storing said reference frame.

7. The apparatus defined in claim 6, wherein said motion vector searcher shifts a motion vector search range by said forward motion vector from a reference position to obtain a shifted search range and then determines said shifted search range as a current search range, said forward motion vector being obtained through a forward motion vector search of a reference frame used for said forward motion vector search.

8. The apparatus defined in claim 7, wherein said motion vector searcher adaptively changes a search range so as to include an original search reference position when said forward motion vector is larger than a predetermined value.

9. The apparatus defined in claim 6, wherein said motion vector searcher obtains a motion vector by performing a motion vector search of each of said B-frames over a predetermined range, using said bidirectional motion vector, with a position within a reference frame corresponding to said bidirectional motion vector used as a reference position, and then determines said motion vector as a motion vector in each B-frame.

10. A signal-bearing medium tangibly embodying a program of machine-readable instructions executable by a digital processing apparatus to perform a method of coding moving pictures, wherein said method uses intra-frame coding and forward motion compensation interframe predictive coding to a moving picture signal, in predetermined block units and at predetermined frame intervals and uses bidirectional motion compensation interframe predictive coding to plural B-frames between an I-frame and a P-frame, said I-frame being subjected to said intra-frame coding, said P-frame being subjected to said forward motion compensation interframe predictive coding, said method comprising:

reducing a magnitude of a forward motion vector in accordance with a frame distance between each B-frame and a reference frame (an I- or P-frame) in said forward motion-compensated interframe prediction, said forward motion vector being obtained in a forward motion vector search of said P-frame, and then distributing a reduced vector as a forward motion vector to each of said B-frames;

performing a backward motion vector search to a B-frame following said I- or P-frame of said B-frames, with said I- or P-frame used as a reference frame;

reducing a magnitude of a backward motion vector in accordance with a frame distance between each B-frame and a reference frame (an I- or P-frame) in said backward motion vector search, said backward motion vector being obtained in said motion vector search, and then distributing a reduced vector as a backward motion vector; and using bidirectional motion compensation interframe predictive coding to each of said B-frames, based on said forward motion vector distributed and said backward motion vector distributed.

11. A signal-bearing medium tangibly embodying a program of machine-readable instructions executable by a digital processing apparatus to perform a method of coding moving pictures, wherein said method uses intra-frame coding and forward motion compensation interframe predictive coding to a moving picture signal, in predetermined block units and at predetermined frame intervals and uses bidirectional motion compensation interframe predictive coding to plural B-frames between an I-frame and a P-frame, said I-frame being subjected to said intra-frame coding, said P-frame being subjected to said forward motion compensation interframe predictive coding, said method comprising:

obtaining a forward motion vector by performing a forward motion vector search of said P-frame, with said I- or P-frame used as a reference frame, and then using forward motion compensation interframe predictive coding to said forward motion vector;

distributing a reduced vector as a forward motion vector to each of said B-frames, said reduced vector being obtained by reducing the magnitude of a motion vector, using said forward motion vector, and in accordance with a frame distance between a reference frame and each B-frame used for said forward motion vector search;

performing a backward motion vector search of a B-frame following said I- or P-frame of said B-frames, with said I- or P-frame used as a reference frame, and thus obtaining a backward motion vector;

distributing a reduced vector as a backward motion vector to each of said B-frames, said reduced vector being obtained by reducing the magnitude of said motion vector, using said backward motion vector, and in accordance with a frame distance between a reference frame and each B-frame used for said backward motion vector search; and using a bidirectional motion compensation interframe predictive coding to each of said B-frames, based on said forward motion vector and said backward motion vector.

12. The signal-bearing medium defined in claim 11, said method further comprising:

changing a search range for shifting a motion vector search range by a forward motion vector from a reference position to obtain a shifted search range, said forward motion vector being obtained in said forward motion vector search to said reference frame, and thus determining said shifted search range as a current search range.

13. The signal-bearing medium defined in claim 12, wherein said changing said search range comprises:

adaptively changing a search range so as to include an original search reference position when said forward motion vector is larger than a predetermined value.

14. The signal-bearing medium defined in claim 11, further comprising:

re-searching for obtaining a motion vector by performing a motion vector search search over a predetermined range, using a bidirectional motion vector distributed to each B-frame, with a position corresponding to said bidirectional motion vector within a reference frame used as a reference position, and determining said motion vector as a motion vector to each B-frame.

15. The signal-bearing medium of claim 10, said signal-bearing medium comprising one of:

a standalone diskette containing said instructions, said diskette for inserting into a computer drive:

a hard drive in a computer; and a program memory in one of a computer and a computer peripheral, said program memory storing instructions for a program currently being executed.

* * * * *